United States Patent [19]

Hinzpeter

[11] 4,062,914
[45] Dec. 13, 1977

[54] METHOD AND APPARATUS FOR MONITORING THE COMPRESSION FORCE OF PELLETING PRESS RAMS

[75] Inventor: Jurgen Hinzpeter, Schwarzenbek, Germany

[73] Assignee: Fa. Wilhelm Fette GmbH, Postfach, Germany

[21] Appl. No.: 684,821

[22] Filed: May 10, 1976

[30] Foreign Application Priority Data

May 9, 1975 Germany .......................... 2520662

[51] Int. Cl.² ............................................. B29C 3/06
[52] U.S. Cl. .............................. 264/40.1; 425/136; 425/149; 425/354
[58] Field of Search ................ 425/136, 149, 354, 78; 264/40

[56] References Cited

U.S. PATENT DOCUMENTS

| 3,255,716 | 6/1966 | Knoechel et al. | 264/40.4 |
| 3,525,382 | 8/1970 | Devol | 425/137 X |
| 3,734,663 | 5/1973 | Holm | 425/149 X |
| 3,807,914 | 4/1974 | Paulson et al. | 425/149 X |
| 3,891,375 | 6/1975 | Pilewski | 425/354 X |

Primary Examiner—Robert L. Spicer, Jr.
Attorney, Agent, or Firm—Sughrue, Rothwell, Mion, Zinn and Macpeak

[57] ABSTRACT

A tablet compressing machine includes strain gauge sensors 5, 5' for monitoring the forces applied to piston rams 1, 2 by pressure rollers 3,4. The strain gauges are connected in a bridge circuit whose amplified output is fed to a mean value generator 15 and a logic control unit 9. The former generates a mean pressing force curve (A in FIG. 3) while the latter causes preset individual limit values for the pressing force signals (B, C in FIG. 3) to track fluctuations in the mean value curve, and compares the instantaneous pressing force signals with the individual limit values. Whenever these limit values are exceeded or fallen below the machine is disabled and the faulty ram is indicated on a display 14 by means of a sensor 7 which signals the ram being monitored. Means are also provided for disabling the machine whenever the mean value exceeds or falls below adjustable tolerance limits.

6 Claims, 3 Drawing Figures

METHOD AND APPARATUS FOR MONITORING THE COMPRESSION FORCE OF PELLETING PRESS RAMS

BACKGROUND OF THE INVENTION

1. Field of the Invention

This invention relates to a method and apparatus for monitoring the compressing force of pelleting press rams.

2. Description of the Prior Art

For the production of tablets, compressing machines are used which have rams which compress the powdery material, from which the tablets are to be produced, in a matrix. Operational breakdowns of various types can occur resulting from the break of a ram or inaccuracies of the compression tools which have developed through wear or as a result of manufacturing tolerances. Furthermore, in practical operation there sometimes occur some inaccuracies in dosing which develop as a result of a faulty setting of the dosing installation and also occasionally there is a double compression of tablets. In order to recognize such operating trouble in good time, it is known to provide tablet compressing machines with a monitoring device for the compression force. Such a known monitoring device for the compression force has wire strain gauges, which are disposed on the carrier of the pressure rolls for the rams. As a result of variable compression forces, variable expansions of the pressure roll carriers are created. As a result of the wire strain gauges such expansions are converted into proportional tension signals. In the known instruments a mean value is formed from the successive pressure force signals, the value of which is monitored in relation to two adjustable tolerance limits. Whenever the mean value exceeds one of the tolerance limits, the machine is disabled. However, it has turned out in practice that not all of the previously mentioned causes for operating trouble can be recognized in time with such measuring processes and instruments, since, for example, in the case of the breaking of a ram of a machine, the mean value does not essentially change since there is a multiplicity of rams. Further, whenever a machine is put in operation which is defective from the very beginning, as when it has a broken ram, such condition cannot be determined subsequently with the known arrangements since this defect does not reveal itself in the manner of a shifting of the mean value.

Therefore, with the prior art arrangement, individual tablets which do not correspond to a certain theoretical weight cannot be sorted out within narrow limits. In the case of a piling up of defective tablets, the known press can be disconnected automatically. However, such an arrangement is not effective in actual practice because outside of the normal dosing and thus weight fluctuations of the tablets, still other values or parameters, such as, for example, tolerances in the length of the ram, a press roller stroke, etc., will influence the compression force. In the case of such defects, with the known arrangement tablets will still be sorted out in an undesirable manner based only on their correspondence to the theoretical weight. Therefore, a supervision and sorting out of the weights of the tablet within narrow limits is not possible with the known arrangement.

SUMMARY OF THE INVENTION

It is an object of this invention to provide a monitoring instrument that, in the case of fluctuations of the mean value which are greater than independently adjustable fixed limits, and in the case of relatively large strays of individual values, as in the case of the breaking of a ram, in the case of a double filling, etc., the press will be disconnected. One must start out from the fact that, in the case of limits of individual values, one can require no particularly high degree of precision, and because of the machine tolerances it is also not possible to achieve as simple a control as possible.

According to the invention, provision has been made for the mean value to be compared continuously with two fixed theoretical values and for maxima of the individual values of the pressing forces to be compared with two independently adjustable limits of individual values, which will follow the mean value in the case of fluctuations thereof. Signals exceeding as well as falling below both the mean value as well as the individual value limits are recorded and can result in a disconnection of the press. In other words, the limits of the individual value curves are continuously dependent on the course of the mean value. Whenever the curve of the mean value changes in its position, then the curves of the individual value limits automatically shift along, so that therefore no stopping of the machine takes place as a result of the shifting of the border curve of an individual value toward one of the other curves, whenever the individual values lie within the area of this curve of individual values or whenever they slightly exceed or fall below it. However, the machine stops whenever the border curve of the mean value shifts in such a way that it exceeds the adjustable limit of a theoretical value known per se.

Since all of the individual values are compared with the mean value borders, it will be possible, that in case of exceeding or falling below the border values, the pertinent ram will be digitally recorded as a result of a press force signal, so that therefore the break of a ram is recognizable even though the mean value does not change considerably. At the same time, the connection can be accomplished in such a manner that an automatic switching off of the tablet compressing machine is accomplished as soon as a measured individual force lies outside of the tolerance limits and also in the case of a shifting of the entire mean value beyond the limit of its theoretical value.

Contrary to the known supervision of mean values, the monitoring of individual rams according to this invention has the advantage that the wearing down of one of a plurality of rams, the breaking of a ram, a double pressing of tablets, and similar defects can be recognized immediately.

DESCRIPTION OF THE PREFERRED EMBODIMENT

Figure 1:
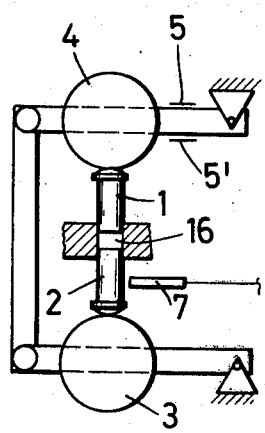
FIG. 1 shows a sector of a tablet compressing machine with rams, pressure rolls and matrixes.

The rotary tablet compressing machine shown in FIG. 1 has a revolving disc with a plurality of matrix bores 16 with which a pair of upper rams 1 and lower rams 2 are associated. During the compression of a tablet at a press station the rams 1 and 2 are pressed into the matrix by pressure rollers 3 and 4. These pressure rollers are held by a carrier which is provided with wire strain gauges 5 and 5'. By means of these wire strain gauges the deflection or sagging of the carrier, which is dependent on the pressure applied to the rams, can be measured and converted into proportional voltage signals.

Figure 2:
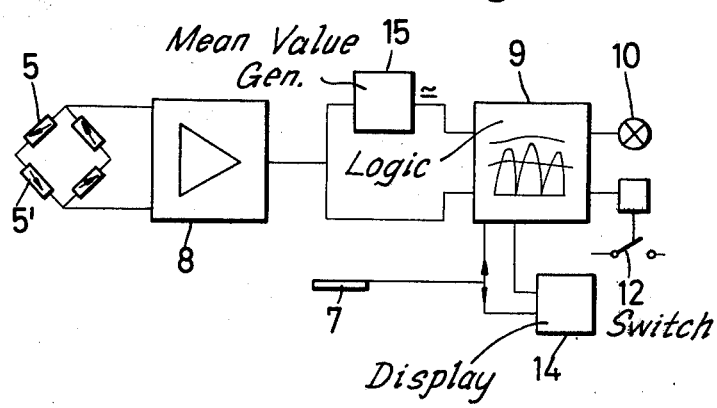
FIG. 2 shows the connections of the supervisory device of the pressing force.
Figure 3:
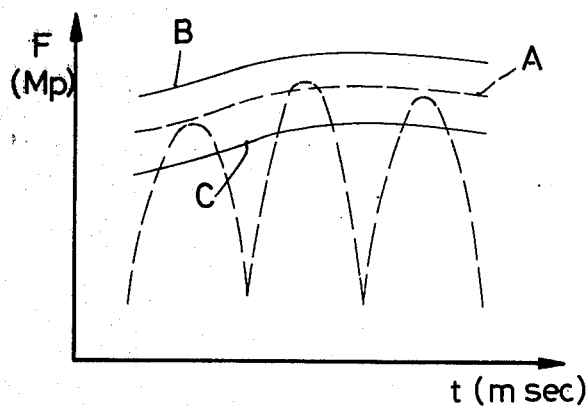
FIG. 3 shows a diagram of the measured values.

For this purpose the wire strain gauges 5 and 5' are connected in a Wheatstone bridge, as seen in FIG. 2. The voltage changes which occur during pressing in the wire strain gauges 5 and 5' are amplified by an amplifier 8. A mean value is formed from the individual pressing force signals by a mean value generator 15, as shown by curve A in FIG. 3. Two independently adjustable border values B and C can be set in relation to this mean value A. The individual pressing force signals, in particular their maxima, are compared with the curves A, B and C in the electronic logic control unit 9.

A proximity switch 7 is also provided for the monitoring device, which, upon the passage of a ram 2 between the pressure rollers 3 and 4, delivers a pulse to the control unit. Whenever an individual pressing force exceeds the upper tolerance limit according to curve B or falls below the lower limit according to curve C, this is indicated by a light 10, and the control circuit can also disable the machine at the same time by means of a disconnect switch 12.

Since the ram stations are numbered consecutively, for example from 1 to 36, then in the case of the breaking of ram 18 and thereby too low a pressing force, the number 18 would be indicated in addition on a control light 14.

An advantage of this arrangement is that in the case of fluctuations of the mean value A, a stopping of the machine does not take place continuously. The possible limits for the fluctuations of the mean value are relatively narrow and are therefore closer to the curve A than are the curves B and C. The mean value is monitored by fixed limit means not shown in the drawing, and in addition, the individual values are monitored in dependence on the position of their maxima relative to the pertinent mean value. At the same time it must be taken into consideration, that the mean value fluctuates continuously, since in the case of the compressed granulate we are dealing with a mixture which is not completely homogenous and does not always feed-in evenly. Furthermore, one must take into consideration that the tool tolerances not only have an effect on individual values, but also on the mean value.

In the prior art wherein fixed, common limits are provided for the individual values and the mean value, a disadvantage is that in the case of a fluctuation of the mean value close to one limit, an individual value deviating only slightly therefrom will lead to a stopping of the machine, which is not desirable whenever said individual value is still close to the mean value. According to the invention, on the other hand, the limits B and C shift with the line A of the mean value and by themselves form the limits for the individual values. Therefore, according to the invention no disconnection of the machine will take place where the individual value is still close to the line A of the mean value, whenever said line has shifted out of the normal middle position. Thus, the individual values are compared both indirectly with the mean value as well as directly with the border values, because the indirect comparison results from the position of the mean value curve A in relation to its fixed limits, not shown in the drawing, and the direct comparison results from the position in relation to the curves B and C.

A continuous comparison is accomplished by the logic control unit 9, which compares the individual pressing force signals with curves A, B and C, so that curves B and C maintain a proper distance in relation to curve A whenever its course changes. Therefore, a comparison of the individual pressing forces need only be accomplished with relation to curves B and C and not additionally in relation to curve A, on the assumption that the two first mentioned curves continuously maintain the same distance in relation to curve A.

I claim:

1. In a method of monitoring the pressing force of the rams of a tablet compressing machine, wherein successive measurement of the pressing forces are used to derive a means value and two fixed individual limit values the improvement comprising the steps of:
    a. Continuously comparing the mean value with said two fixed theoretical limit values,
    b. Comparing the maxima of the individual measured values of the pressing forces with two independently adjustable individual limit values, and
    c. Automatically adjusting the individual limit values in response to fluctuations of the mean value independent of said fixed limit values.

2. A method as defined in claim 1, wherein the pertinent ram is digitally recorded whenever its pressing force signal exceeds or falls below the individual limit values.

3. A method as defined in claim 1, wherein the tablet compressing machine is automatically disconnected whenever a pressing force signal exceeds or falls below the individual limit values.

4. In a pressing force monitoring apparatus for a tablet compressing machine for monitoring the pressing forces of the rams, including means for forming a mean value from successive measuring results of the pressing forces, the improvement comprising means for forming two independently adjustable individual limit values and means for comparing the maxima of the individual values of the pressing forces.

5. A pressing force monitoring apparatus according to claim 4, wherein the rams are numbered continuously and the apparatus includes a recording mechanism which digitally records the pertinent ram whenever its pressing force signal exceeds or falls below the individual limit values.

6. A pressing force monitoring apparatus according to claim 4 further comprising a switch for automatically disconnecting the tablet compressing machine whenever a pressing force signal exceeds or falls below the individual limit values.

* * * * *